W. P. BROWN.
BRUSH HOLDER.
APPLICATION FILED JAN. 17, 1912.
1,060,533.
Patented Apr. 29, 1913.
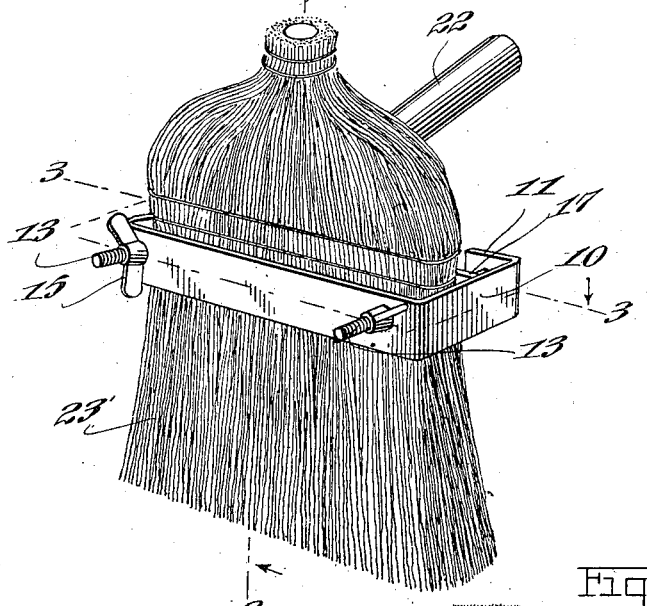
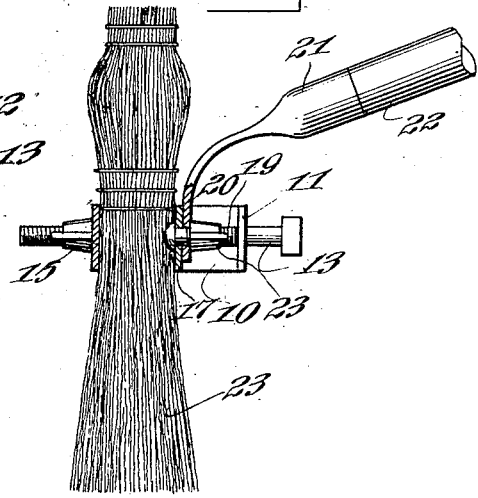
Inventor
William P. Brown
By Victor J. Evans
Attorney
Witnesses

UNITED STATES PATENT OFFICE.

WILLIAM P. BROWN, OF SILER CITY, NORTH CAROLINA.

BRUSH-HOLDER.

1,060,533.  Specification of Letters Patent.  Patented Apr. 29, 1913.

Application filed January 17, 1912.  Serial No. 671,662.

*To all whom it may concern:*

Be it known that I, WILLIAM P. BROWN, a citizen of the United States, residing at Siler City, in the county of Chatham and State of North Carolina, have invented new and useful Improvements in Brush-Holders, of which the following is a specification.

An object of the invention is to provide a device for removably holding a brush, the handle thereof being detachable.

My invention is particularly adapted for use in connection with scrubbing brushes and provides a holder for securely gripping the scrubbing brush when the same is used, the mentioned scrubbing brush being removable from the holder for the purpose of supplying the holder with a new scrubbing brush when the old one is worn out.

In the further disclosure of the invention, reference is to be had to the accompanying drawings constituting a part of this specification, and in which similar characters of reference denote corresponding parts in all the views, and in which—

Figure 1 is a perspective view of my holder, showing a brush attached thereto. Fig. 2 is a vertical sectional view taken on the line 2—2 in Fig. 1, looking in the direction of the arrow. Fig. 3 is a horizontal sectional view taken on the line 3—3 in Fig. 1, looking in the direction of the arrow.

Referring more particularly to the views, I provide a U-shaped frame 10, having laterally extending flanges 11 formed on the ends thereof, the said flanges 11 being provided with apertures 12 adapted to receive therethrough suitable headed screws 13, the said screws being passed through apertures 14 formed in the frame 10, thumb nuts 15 being adapted for threaded engagement with the ends of the screws 13. Lock nuts 16 are mounted on the screws 13, between the frame 10 and the flanges 11 thereof and an apertured gripping plate 17 is then mounted on the screws 13, locking nuts 18, similarly to the locking nuts 16 being then threadedly mounted on the screws 13 so that the gripping plate 17 will be positioned between the locking nuts 16 and the locking nuts 18, which when operated to engage both sides of the gripping plate will retain the same in rigid engagement with the screws 13. A screw 19 is passed transversely through the central portion of the gripping plate 17 and the end of the screw 19 is passed through a plate 20, formed integrally with a socket 21 adapted to receive a handle 22 therein, a suitable thumb nut 23 being threadedly mounted on the end of the screw 19, the said thumb nut being operable on the screw 19 to engage the plate 20 and retain the same in rigid engagement with the gripping plate 17.

In the use of my device the thumb nuts 15 are screwed outwardly toward the ends of the screws 13, thus permitting the screws to slide relatively to the frame 10 so that the gripping plate 17 can be moved outwardly toward the flanges 11 to increase the space between the forward front end of the frame 10 and the gripping plate 17, a suitable brush 23 being then inserted between the front end of the frame 10 and the gripping plate 17, after which by turning up the thumb nuts 15, the gripping plate 17 will be drawn toward the front end of the frame 10 thus substantially gripping the brush 23 and rigidly holding the same between the front end of the frame 10 and the gripping plate 17 as shown in Fig. 1. By unscrewing the thumb nut 23, the plate 20 can be disengaged from the screw 19 thus providing for the removal of the socket 21, the mentioned plate 20 being adapted to swing relatively to the screw 19 and being preferably curved, as shown in Fig. 2, in order that the handle 22 can be swung to the right or to the left of the pivotal connection of the handle with the gripping plate 17.

By referring to Fig. 3 it will be seen that brushes of various sizes can be inserted between the front end of the frame 10 and the plate 17 and if desirable a brush in the form of a cloth or the like can be mounted on the frame 10 in the manner described heretofore.

I claim:—

1. In a brush holder, the combination of a U-shaped frame, having laterally extending flanges formed at the ends thereof, screws mounted to slide on the frame and passing through apertures in the said flanges, thumb nuts having threaded connection with the said screws and movable thereon to engage the frame, a plurality of locking nuts having threaded connection with each of the said screws and normally spaced apart, a gripping plate mounted on the said screws and interposed between the said locking nuts thereon, and a handle for connection with the said plate.

2. In a brush holder, the combination of a frame, screws mounted thereon, a gripping plate mounted to slide on the said screws, means on the said screws for holding the gripping plate thereon, thumb nuts having threaded connection with the screws and engaging the frame, and a handle for attachment to the said gripping plate.

In testimony whereof I affix my signature in presence of two witnesses.

WILLIAM P. BROWN.

Witnesses:
  D. G. Fox,
  Henry Robertson.